United States Patent [19]

Love

[11] Patent Number: 5,454,185

[45] Date of Patent: Oct. 3, 1995

[54] ARM MOUNTED FLY PACK

[76] Inventor: Peter G. Love, 15505 121st Ave. Court East, Puyallup, Wash. 98374

[21] Appl. No.: 267,665

[22] Filed: Jun. 19, 1994

[51] Int. Cl.⁶ ................................................ A01K 97/06
[52] U.S. Cl. ........................ 43/57.1; 224/920; 224/219; 206/315.11
[58] Field of Search ................... 206/315.11; 224/219, 224/222, 901, 920, 267; 43/54.1, 57.1, 57.2, 25.2

[56] References Cited

U.S. PATENT DOCUMENTS

| | | | |
|---|---|---|---|
| 206,206 | 7/1878 | Yerrinton | 43/57.1 |
| 1,623,429 | 4/1927 | Martinson | 43/57.1 |
| 2,533,865 | 12/1950 | Wynne | 43/57.1 |
| 2,795,890 | 6/1957 | Metsker | 43/57.1 |
| 2,978,830 | 4/1961 | Killian | 43/57.1 |
| 3,121,970 | 2/1964 | Oakes | 43/57.1 |
| 3,160,158 | 12/1964 | Rayhart | 224/222 |
| 3,769,741 | 11/1973 | Bucklin | 206/315.11 |
| 3,933,286 | 1/1976 | Karkas | 224/219 |
| 5,131,180 | 7/1992 | Ives | 43/57.1 |

OTHER PUBLICATIONS

Orvis, Spring Fishing and Outdoor 1994; vol. III No. 3 pp. 1, 46, 54, 56, 57, 66, 67, 68, 69, 72, 74.

Primary Examiner—Mark Rosenbaum
Assistant Examiner—James Miner
Attorney, Agent, or Firm—Stratton Ballew

[57] ABSTRACT

A portable, wrist-mounted lure storage device having a wrist band and a hook-receiving mechanism of pliant material attached to the band for releasably engaging a hook portion of a fishing lure.

6 Claims, 2 Drawing Sheets

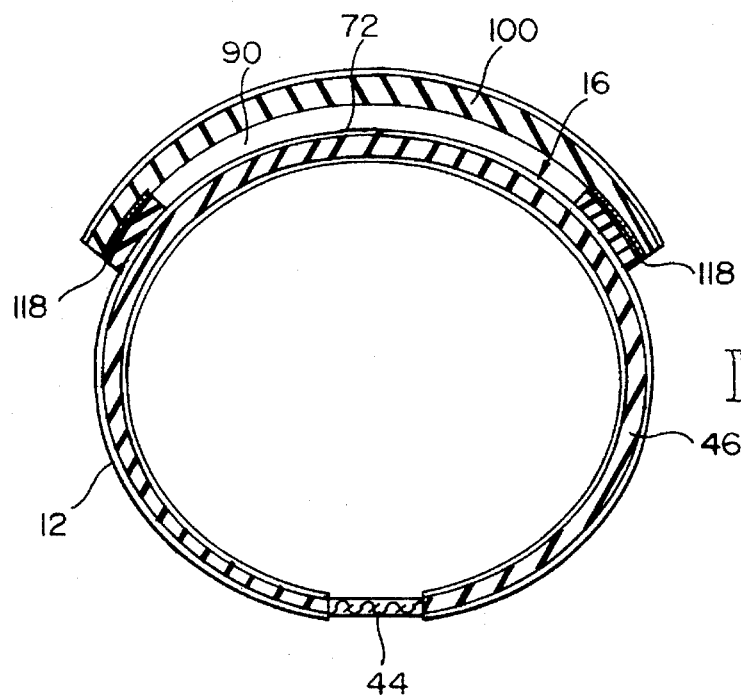
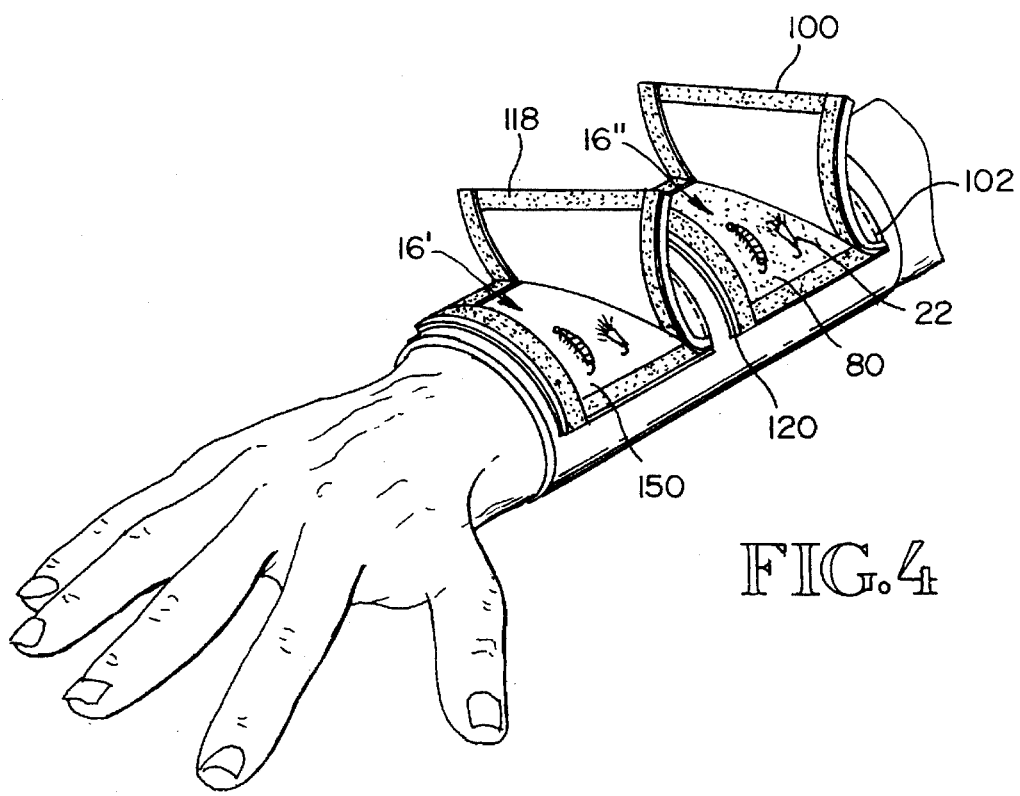

ARM MOUNTED FLY PACK

TECHNICAL FIELD

The invention relates to portable devices for storing fishing lures. More specifically, the invention relates to body-mounted storage devices for temporary storage and rapid retrieval of sportfishing lures.

BACKGROUND OF THE INVENTION

Flyfishing is one of America's most enduring sporting traditions, and the number of flyfishing enthusiasts continues to increase dramatically in the United States and elsewhere as the pleasures of the sport become more and more widely appreciated. Consequently, the demand for new technology relating to flyfishing, and sportfishing in general, has never been greater.

A paramount interest among flyfishermen is mobility; that is, the ability to travel considerable distances in difficult terrain, and to execute finely tuned casting movements, free from the restrictions imposed by heavy and bulky gear. Consequently, a ponderous assortment of accessories is antithetical to the flyfisherman's credo, and technology which improves the portability of fishing tackle is in particularly great demand.

Along with portability, ready accessibility of fishing tackle is another primary need of the flyfisherman. Even the most skilled flycaster faces a major challenge in performing delicate casting activities which must be coordinated while the fisherman balances on unstable surfaces in rushing currents. Marshalling the appropriate control under these circumstances not only requires great freedom of movement, but also calls for fingertip accessibility of one's entire outfit of equipment.

Stripped down to the bare essentials, the flyfisherman can practice his art with nothing more than a rod setup and a suitable assortment of flies. The choice and variety of flies is critical, because the flyfisherman must be ready to deploy the one special fly that satisfies the singular tastes of an individual trout at a particular point in time. The chances for success and failure in this formula are infinite, therefore the ability to access and deploy a large number and variety of flies in a short period of time is essential.

Rapid deployment of fishing flies requires a storage device which can be accessed quickly, and which offers fast and easy selection among a large assortment of lures. Previous attempts to satisfy these needs have resulted in the production of a large host of fly storage containers; ranging from small, simple boxes, to large cases having multi-compartmented lure display panels, among other designs. Each of these storage devices shares a fundamental drawback, in that they all must be stowed away, for example in a vest pocket or tackle box, during periods of non-use. Retrieval of the storage device can therefore be frustrating and difficult, given that the flyfisherman typically has his hands occupied with other equipment at the same time he is searching and fumbling for his lure container. Access problems also arise during selection and removal of lures from the container after it has been retrieved. If the container is a simple box, the fisherman must poke through a tangled array of flies in the box to find the object of his search. Alternatively, if the container has display panels, the fisherman must open the box, leaf through the panels and select and remove the fly of choice, without dropping the box or flies. These activities can be particularly challenging when, as is often the case, the fisherman's dexterity is limited by numbness, wetness or other factors.

Currently known fly containers suffer other accessibility problems arising from difficult to handle containers and closure mechanisms. Both the containers and closure mechanisms are typically quite small, making them difficult to manipulate, especially when the user's hands are occupied or his dexterity is otherwise limited. In addition, the closures are typically plastic or metal snap-type closures, which tend to open suddenly, enhancing the likelihood of dropping or spilling the container or flies. Likewise, the plastic containers and closures are susceptible to breakage, causing further problems relating to access and equipment loss.

Attempts to overcome these problems relating to portability and access have met with limited success. These efforts include the age old tradition of affixing lures to the brim of a fishing hat. Another widely practiced method is to anchor lures in a patch of fleece material, such as sheep's wool, attached to a chest portion of a fishing vest. While both of these storage devices offer enhanced portability and access due to the body-mounted nature of the devices, they each suffer significant disadvantages. In particular, the hat-brim option still requires stowing and retrieval of the hat between lure changes in order to view lures for selection purposes. This requirement restricts mobility and access and enhances the risk of equipment loss. Likewise, viewing of lures mounted on fleece chest patches necessitates craning of the neck, and may require removal of outer clothing layers. In either case, viewing of a hook portion of the lure to determine whether it is barbed or barbless is generally impossible without complete removal of the hook portion from the hat or vest patch.

More importantly, canvass fishing hats and fleece patches are poorly suited as hook-receiving materials for releasably engaging lures. Canvass and other heavy, woven textiles are non-pliant, i.e. they are too unyielding to allow ready insertion and removal of a hook portion of the lure. Excessive force is necessary to insert the hook portion, because the heavy, tightly woven canvass material resists penetration by the hook portion. Likewise, canvass is not sufficiently pliant to allow easy disengagement of lures, because the heavy, tightly woven canvass threads catch unyieldingly on barbed hook portions of some lures.

Canvass and other non-pliant materials also lack sufficient resiliency to provide secure anchorage for barbless lures. Insertion of the hook portion of the lure through the material creates an opening which does not spring back to exert frictional force against a shaft of the hook portion to hold the lure in an engaged position. Consequently the hook portion may slide out of the loose opening in the canvass, causing the lure to disengage and potentially be lost.

In contrast to canvass, fleece materials generally have more than sufficient pliancy to enable easy insertion and removal of barbed and barbless hook portions. However, the loose fiber arrangement of fleece fails to provide sufficient resiliency to exert frictional resistance to prevent dislodgement of barbless hook portions, leading to an unacceptably high risk of lure loss.

The hook-receiving materials used in box-type lure storage devices also suffer from poor pliancy and resiliency qualities. Standard materials in this case include cork and closed celled foams, such as polystyrene. These materials generally have limited pliancy, and significant force may be required to penetrate or engage the hook portion into the material. Disengagement of the hook portion is also hindered by a dense, rigid cell structure of cork and styrofoam, such that pulling the hook out often causes chunks of the hook-receiving material to be ripped out. This results in degradation of the hook receiving material by the formation of permanent holes or gouges in the material. The poor resiliency of cork and styrofoam also contribute to degradation of the materials, because voids in the material surrounding inserted hooks fail to spring back or "self-heal" when the hook is disengaged. These holes and voids lead to failure of the materials to securely engage the hook portions of lures inserted in or near the holes. This in turn leads to increased lure loss and requires additional time for selecting undamaged portions of the material to insert the hook portions.

Holes and gouges in hook-receiving materials of lure storage devices can also serve as wells for pooling and retaining water within the material. This pooling and retention of water is highly undesirable, because it can cause rusting of lures rendering them non-functional. In addition, water retention can contribute to wetting of "hackle" portions of dry flies, which typically must remain absolutely dry for optimal lure performance.

In light of the above, a need exists in the sportfishing tackle industry for a lure storage device which is extremely portable and which causes minimal interference with the user's mobility and comfort.

A further need exists for a lure storage device which is readily accessible and which can be easily and securely manipulated under adverse conditions to provide quick, reliable access to lures.

A further need exists for a lure storage device which provides a convenient visual display of a large number of lures at a time, to facilitate rapid selection among a variety of lures. A related need exists for a lure storage device which enables quick visual selection between lures having different hook portion designs.

An additional need exists for a lure storage device which provides an improved hook-receiving material for rapid, dependable storage and retrieval of lures. A related need exists for a hook-receiving material suitable for receiving both barbed and barbless hook portions of lures, and which is not subject to rapid structural degradation through use.

Yet another need exists for a lure storage device which provides a water resistant storage environment to prevent wetting and rusting of stored lures.

SUMMARY OF THE INVENTION

It is therefore an object of the invention to provide a lure storage device which is lightweight, compact and which minimizes interference with the user's mobility and comfort.

It is a further object of the invention to provide a lure storage device which can be accessed by a fisherman without the need for time consuming stowing and retrieval steps. Similarly, it is an object of the invention to provide a lure storage device which can be readily and reliably handled and operated to provide quick access to lures without substantial risk of equipment loss due to spilling or dropping.

It is a further object of the invention to provide a lure storage device having an efficient, low cost lure display mechanism to provide for rapid selectability among a variety of lures, including lures having different hook portion designs.

It is an additional object of the invention to provide a lure storage device having an advanced hook-receiving mechanism for quick, easy and secure engagement and disengagement of both barbed and barbless lures. Similarly, it is an object of the invention to provide a lure storage device which includes a hook-receiving mechanism which is durable through long-term use and is inexpensive to manufacture.

It is yet another object of the invention to achieve the above objects in a lure storage device which provides a water resistant storage environment to minimize wetting and rusting of lures.

It is a more general object of the invention to provide a lure storage device which possesses a broad range of functions, to optimize the utility, portability, accessibility and comfort of the device.

The invention achieves these objects and other objects and advantages which will be made apparent by the description which follows, by providing a portable, arm-mounted lure storage device featuring a flexible wrist or arm band, sleeve or glove portion and a hook receiving mechanism of pliant material attached to the band or arm-mounting portion for releasably engaging a hook portion of a fishing lure.

In a preferred embodiment of the invention, the device is wrist mounted and may be provided in a variety of structures, including closed and openable bands, straps and cuffs, suitable for removable mounting on a human wrist. Likewise, the pliant material of the hook-receiving mechanism may be formed of a variety of suitable materials ranging from pliant fleece and unskinned, foamed elastomers, to semi-pliant, woven textile-coated elastomers, among other materials.

In an alternate embodiment of the invention, the storage device features a lure storage compartment for providing selectable access by a wearer of the device to the hook-receiving mechanism. The compartment includes a sidewall and a cover having a closure mechanism for easily, selectably closing and opening the storage compartment.

In a further detailed embodiment, the closure mechanism includes a seating surface for sealably closing the lure storage compartment so that the lure compartment is resistant to influx of water when the cover is closed.

In yet another detailed embodiment of the invention, the hook-receiving mechanism of the storage device has a plurality of lure-mounting sections, including a first section of pliant material for releasably engaging an end portion of a barbed fishing hook, and a second section of semi-pliant material for releasably engaging an end portion of a barbless hook portion of a lure.

BRIEF DESCRIPTION OF THE DRAWINGS

FIG. 3 is a transverse-sectional view of an embodiment of the invention having an elastic mid-piece of the wrist band.

FIG. 4 is an alternate embodiment of the invention including a plurality of lure mounting sections.

DETAILED DESCRIPTION OF THE PREFERRED EMBODIMENTS

Figure 1:
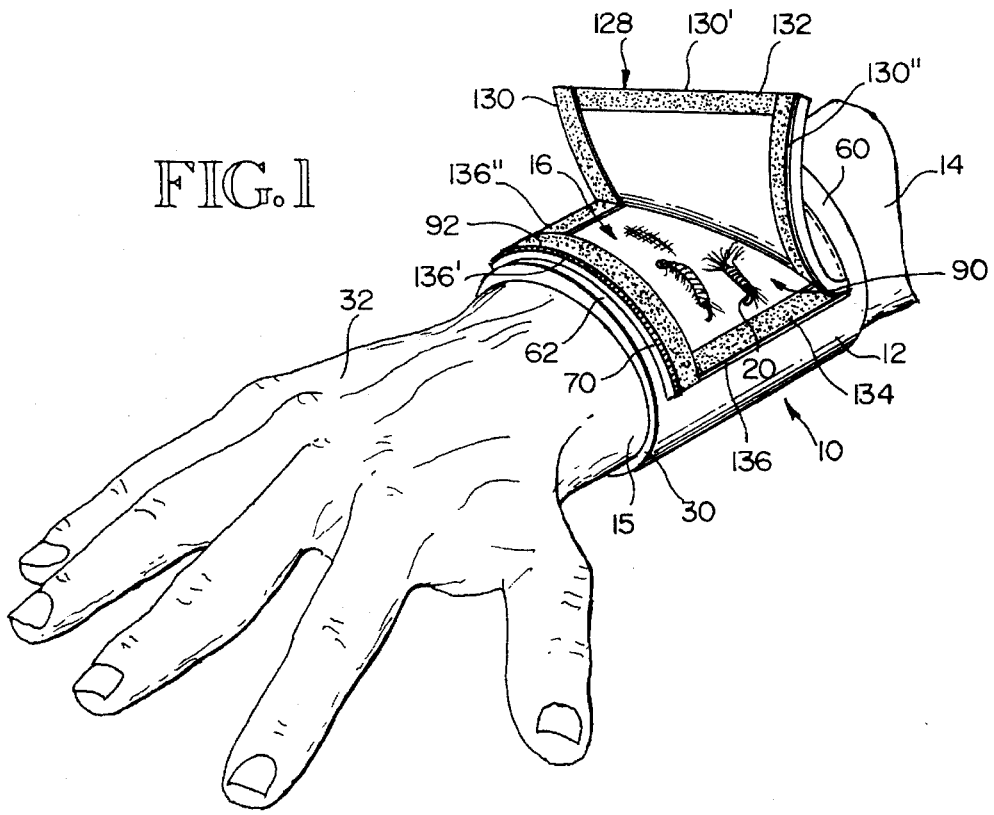
FIG. 1 is an isometric view of a lure storage device employing the concepts of the present invention, mounted on a human wrist.

A portable lure storage device employing the concepts of the present invention is generally indicated at reference numeral 10 in FIG. 1. The device includes a mounting band 12 designed for removably mounting the device on a human arm 14, preferably a wrist 15 portion of the arm. In addition, the device includes a hook-receiving mechanism, or lure-mounting section 16, of pliant material attached to the mounting band for releasably engaging a hook portion 20 of a fishing lure 22.

The mounting band 12 may be in a variety of forms, including straps, bands, cuffs, and glove or sleeve portions, and may be of a continuous or openable construction. For example, the band may be in the form of a continuous cuff, as shown in the Figures, or in the form of an openable strap (not shown) resembling a buckled or velcro®-type watch band. Preferably, the mounting band 12 has a closed design, eg. a continuous cuff-shape, and is made of an elastic material 30 which is flexible and resilient enough so that the band can be pulled on easily over a human hand 32, yet will stretch back snugly and comfortably around the wrist 15 or other selected arm 14 portion for proper mounting.

Figure 2:
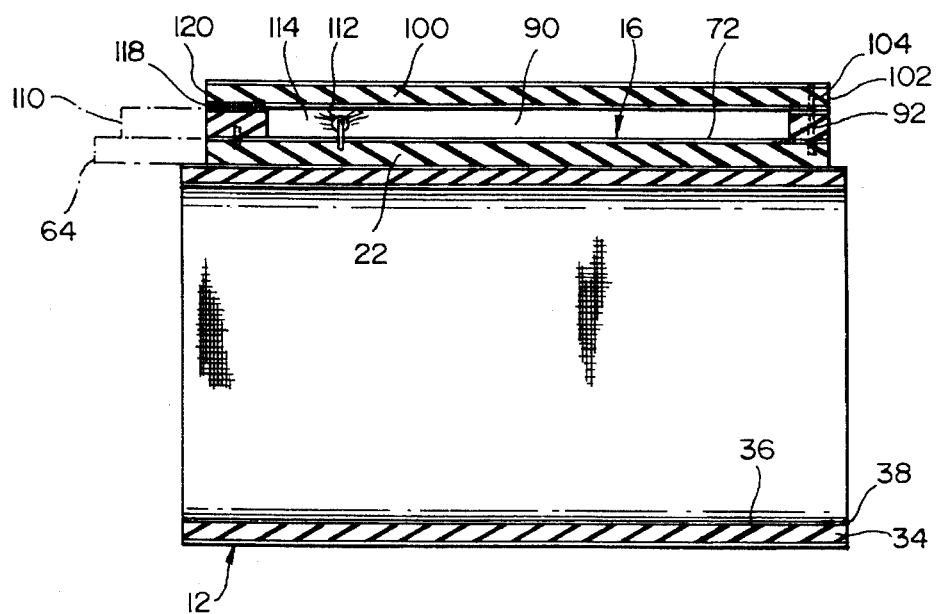
FIG. 2 is a longitudinal-sectional view of the lure storage device of the invention.

A preferred material for construction of the mounting band 12 is a foamed elastomeric material 34, such as neoprene, coated on an inner wall 36 of the band by an inner layer 38 of woven textile material, such as nylon (see FIG. 2). Elastomeric materials elastomers having suitable elastic properties are well known in the art, and are widely and inexpensively available. Neoprene is a particularly preferred elastomer from which to form the elastic mounting band, in part because neoprene offers excellent water resistant and thermal insulating qualities. This provides the ancillary benefits of increased protection and comfort against adverse weather and exposure conditions.

The inner, woven textile layer 38 of the mounting band 12 facilitates mounting and removal of the band from the wearer's wrist 15. The textile layer, as compared to a bare neoprene surface, reduces friction between the inner wall 36 of the band and the wearer's hand 32 and wrist 15, while the user is donning and doffing the device. As illustrated in FIG. 3, mounting and removal is further ameliorated if an elastic midpiece 44, having a lower modulus of elasticity than a remaining portion of the band 46, is included in the band.

The lure mounting section 16 of pliant material is attached to an upper surface of the mounting band 12 for easy viewing of lures 22 embedded or engaged in the mounting section. The mounting section is preferably attached to the mounting band as a separate layer 62 which may be sewn, bonded or otherwise affixed to the upper surface of the band. This ensures that the hook portions 20 of the lures will not penetrate through the mounting band into the wearer's skin. The mounting section itself can vary widely in thickness 64, but is preferably in the range of 3–5 mm. The overall dimensions of the mounting section can also vary, depending on the number of lures intended for mounting thereon. A preferred size is about a 3×3 inch rectangular section 16 suitable for attachment to a comfortable, cuff-shaped mounting band 12 and designed for conveniently storing and displaying a collection of 10–20 flyfishing lures.

The mounting section 16 of the device is preferably formed of a pliant material which also has substantial resilient properties, i.e. a material which readily yields to penetration and withdrawal of a barbed end (not shown) of a lure hook portion 20, but which also has sufficient resiliency to spring back and exert frictional force on the hook portion to prevent unwanted disengagement of lures 22 having unbarbed hook portions 20. Materials which include both pliant and resilient properties are therefore suitable for releasably engaging lures having either barbed or barbless hook portions.

A particularly preferred material to achieve this dual functionality of the mounting section 16 is neoprene. Neoprene provides excellent pliancy because it readily yields to allow insertion and removal of the hook portion 20 of lures. The neoprene also provides secure anchorage for even barbless lures, because the high resiliency of neoprene forms a compression fit around the hook portion to prevent unwanted dislodgement of the lure. In addition to providing for easy, secure mounting of lures, the pliancy and resiliency of neoprene also allows for quick viewing of the hook portions of lures, without necessitating removal of the lure from the mounting section. By rolling the hook portion through the neoprene until an end of the hook portion (not shown) pokes upwardly through the neoprene, a fisherman can tell how sharp the hook portion is and, more importantly, whether the hook portion is barbed or barbless.

Disengagement of the hook portions 20 of lures 22 from the mounting section 16 is facilitated by the less dense and more flexible cell structure of the pliant material, eg. neoprene, compared to cork, styrofoam and other conventional, non-pliant materials. By virtue of its design, neoprene and other pliant materials are highly resistant to ripping and hole formation during normal lure storage activities. The durability and "self-healing" qualities of neoprene reduce the risk of lure loss and maximize the ease of lure storage. In addition, these properties contribute to the overall water resistance of the lure mounting section 16, which in turn limits lure damage attributable to wetting and rusting.

Another preferred hook-receiving material for construction of the mounting section 16 is woven textile-coated neoprene, i.e. neoprene coated by a layer 72 of loosely woven, thin-fibered textile material, or nylon (see FIG. 2). The textile coating over the neoprene reduces the overall pliancy of the mounting section to a semi-pliant condition. The woven textile structure of the nylon provides some increased resistance to penetration of the mounting section by the lure hook portion 20, but engagement of lures into the mounting section is nonetheless relatively easy compared to performance of non-pliant materials, such as cork. Likewise, the relatively loose weave and delicate fiber construction of standard nylon coatings for neoprene resist disengagement of barbed hook portions 20 from the mounting section, but are nonetheless sufficiently yielding to permit disengagement, in contrast to the performance of non-pliant materials such as tightly woven, heavy threaded canvass. Among the advantages of the optional nylon coating is an improved aesthetic appeal, and greater durability of the mounting section.

Yet another preferred hook-receiving material for construction of the mounting section is fleece material 80 (see FIG. 4), which, due to its extreme pliancy, facilitates engagement and disengagement of lures 22 and offers enhanced durability. The fleece material may be a synthetic fleece or pile, or a natural fleece such as sheep's wool.

In a preferred embodiment of the invention, the storage device 10 includes a lure storage compartment 90 for providing selectable access to the hook-receiving section 16. The compartment is formed in part by one or more raised sidewalls 92 surrounding the lure mounting section. The sidewalls may be bonded or otherwise affixed, preferably by stitching 94, to the mounting band 12 or mounting section, and are preferably formed of an easily cut, stitchable material, such as neoprene.

Referring to FIG. 2, the lure storage compartment 90 is further defined by a cover 100 selectably disposable over the lure mounting section 16. Preferably, a first end 102 of the cover is hingedly connected to one of the sidewalls 92, for example by stitching 104 through the cover and sidewall. This allows the cover to be selectively manipulated between an opened position, as shown in FIG. 1, and a closed position, as shown in FIGS. 2 and 3. It is also desirable that the cover be designed for seating atop the sidewalls, and that the sidewalls be of a sufficient height 110 so that the cover clears an upper surface 112 of lures 22 stored in the compartment. This prevents crushing of hackle portions 114 of flies and other delicate portions of lures, and also lends to the water resistant capabilities of the storage device. A preferred height of the sidewalls for providing sufficient clearance for typical flyfishing lures is in the range of about 1/8–1/4 inches.

The cover 100 of the lure storage compartment 90 also preferably has a closure mechanism 118 for securely closing the cover over the lure mounting section 16. The closure mechanism can be attached to a second end 120 of the cover opposite the hinged, first end 102, or, preferably, to an entire free perimeter 128 (e.g. three, unhinged underside 130, 130', 130" of a rectangular shaped, hinged cover). The preferred closure mechanism features a velcro® strip coextensive with the free perimeter for selectably engaging a complementary, free perimetric loop or hook velcro® strip 134 lining upper surface 136, 136', 136" of the sidewalls 92. This form of continuous closure mechanism ensures that the free underside 130, 130', 130" sealably seat against the upper surfaces 136, 136', 136" of the sidewalls to increase the water resistance of the lure compartment. Compartmental resistance to water influx is particularly critical for the storage of dry flies (i.e. flyfishing lures which must remain absolutely dry to support the lure on water surface tension for proper lure function).

The cover 100 of the lure storage compartment 90 is preferably constructed of a flexible material so that the cover can flex when the mounting band 12 is put on and taken off. Likewise, flexibility of the cover facilitates opening and closure of the cover, in part because the cover can flex in the region of the hinged first end 104 to lay over against the wearer's arm 14. A preferred material for this purpose is neoprene which, in addition to having the desired flexibility characteristics, also enhances the water resistance, thermal insulation, visual consistency and aesthetics of the storage device.

In an alternate embodiment of the invention, illustrated in FIG. 4, the lure storage device 10 includes multiple lure mounting sections 16', 16" having different types of hook-receiving materials varying in pliancy, for storing different types of lures 22. Specifically, a first lure mounting section 16' is formed of a semi-pliant material, such as nylon-coated neoprene 150, for preferred storage of barbless lures. A second lure mounting section 16" is formed of a highly pliant material, such as sheep's wool, for preferred storage of lures with barbed hook portions. This enables the fisherman to more readily distinguish between stored lures in terms of whether or not they are suitable for a particular fishing application. Likewise, the different sections can be used for differential storage and easier retrieval of wet and dry flyfishing lures.

Those with ordinary skill in the art will appreciate that other embodiments and variations of the invention are possible which employ the same inventive concepts described above. Therefore, the invention is not to be limited by the above disclosure but is to be determined in scope by the claims which follow.

What is claimed is:

1. A portable, arm-mounted storage device for temporary storage and easy retrieval of fishing lures, comprising;

a flexible mounting band removably mountable around a selected portion of a human arm; and hook receiving means formed of a resilient, elastomeric material covered by an outer layer of woven textile material, the hook receiving means attached to the mounting band for releasably engaging a hook portion of a fishing lure.

2. The device of claim 1, wherein the elastomeric material is neoprene and the woven textile material is woven nylon.

3. A portable, arm-mounted storage device for temporary storage and easy retrieval of fishing lures, comprising:

a flexible mounting band removably mountable around selected portion of a human arm; and hook receiving means attached to the mounting band, the hook receiving means having a first lure mounting section of pliant material for releasably engaging an end portion of a barbed fishing hook, and a second lure mounting section of semi-pliant material for releasably engaging an end portion of a barbless fishing hook.

4. The device of claim 3, wherein the pliant material is a resilient, elastomeric material and the semi-pliant material is a resilient, elastomeric material covered by a layer of woven textile material.

5. The device of claim 3, wherein the pliant material is neoprene and the semi-pliant material is neoprene covered by a layer of woven nylon.

6. The device of claim 3, wherein the pliant material includes a layer of fleece material.

* * * * *